United States Patent [19]

Adachi et al.

[11] Patent Number: 6,115,425

[45] Date of Patent: Sep. 5, 2000

[54] VARIABLE LENGTH CODED DATA TRANSMISSION DEVICE, TRANSMITTER SIDE DEVICE, RECEIVER SIDE DEVICE, AND METHOD THEREOF

[75] Inventors: Satoru Adachi, Yokohama; Tomoyuki Ohya, Yokosuka, both of Japan

[73] Assignee: NTT Mobile Communications Networks, Inc., Tokyo, Japan

[21] Appl. No.: 08/969,318

[22] Filed: Nov. 13, 1997

[30] Foreign Application Priority Data

Nov. 15, 1996 [JP] Japan ..................................... 8-305310

[51] Int. Cl.$^7$ .................................................. H04B 14/04
[52] U.S. Cl. ........................................... 375/253; 375/242
[58] Field of Search ..................................... 375/253, 242, 375/365, 364, 354, 246; 341/63, 67–68; 348/384, 419, 466; 714/192, 775, 798; 370/350, 470, 511, 514, 474, 472, 473

[56] References Cited

U.S. PATENT DOCUMENTS

| | | | |
|---|---|---|---|
| 4,145,683 | 3/1979 | Brookhart | 714/758 |
| 5,050,166 | 9/1991 | Cantoni et al. | 370/94.1 |
| 5,440,345 | 8/1995 | Shimoda | 348/411 |
| 5,455,841 | 10/1995 | Hazu | 375/240 |
| 5,475,540 | 12/1995 | Gold | 360/48 |
| 5,521,915 | 5/1996 | Dieudonne et al. | 370/60.1 |
| 5,729,530 | 3/1998 | Kawaguchi et al. | 370/236 |
| 5,740,373 | 4/1998 | Isaka | 395/200.67 |
| 5,796,743 | 8/1998 | Bunting et al. | 370/474 |
| 5,886,652 | 3/1999 | Adachi et al. | 341/67 |

OTHER PUBLICATIONS

David Redmill, "Robust Architectures for Image and Video Coding", Center for Communications Research Department of Electrical and Electronic Engineering, Queens Building, University of Bristol.

David W. Redmill et al., "The EREC: An Error–Resilient Technique for Coding Variable–Length Blocks of Data", IEEE Transactions on Image Processing. vol. 5, No. 4 (Apr., 1996).

ITU–T Recommendation H.263, "Transmission of Non–Telephone Signals: Video Coding for Low Bit Rate Communication", I.363 (Mar., 1996).

Primary Examiner—Chi H. Pham
Assistant Examiner—Khai Tran
Attorney, Agent, or Firm—Brinks Hofer Gilson & Lione

[57] ABSTRACT

In order to transmit variable length coded data blocks while reducing data loses caused by code errors, the control circuit 7 makes a group of a plurality of variable length coded data, a fixing length circuit 9 fixes the code length of each of the variable length coded data thus grouped so that the data blocks each have an average code length and then makes a group of the data blocks in that condition, a header outputting circuit 8 prepares a header including information on the grouped data blocks and a synchronization word, and a control circuit 7 controls a switch SWC so that the prepared header and the group of data blocks are output through an output terminal 2. On the decoding side, the data blocks are synchronized/decoded by obtaining the code length of the group of data blocks and the number of the data blocks with reference to the location of the synchronization word in the header and information on the data blocks.

6 Claims, 6 Drawing Sheets

VARIABLE LENGTH CODED DATA TRANSMISSION DEVICE, TRANSMITTER SIDE DEVICE, RECEIVER SIDE DEVICE, AND METHOD THEREOF

BACKGROUND OF THE INVENTION

This invention relates to a variable length coded data transmission device, a transmitter side device, a receiver side device, and a method thereof, for transmitting data blocks which are coded to have variable bit lengths, while reducing data losses occurrable due to code errors.

The variable length coding is a coding method, in which coded words having different bit lengths are assigned respectively to various data in accordance with frequency of appearance of each data item, in order to reduce the total quantity of code. Therefore, although the lengths and the end locations of the codes, which codes were subjected to variable length coding processing, are different from each other, it will still be possible that the individual codes are correctly decoded and the ends of the individual codes are correctly recognized only if the bit sequence is correctly read because the decoding is made at the time point when the bits are read on equivalent to the length of the specific code.

If code errors should occur during the transmission of the variable length coded data, the coded data would be decoded incorrectly as if they had different code lengths, on the decoding side. As a consequence, when an loss of synchronization occurs on the bit sequence to be read, decoding is successively carried out in a wrong manner even if no code errors occur. This, in fact, significantly deteriorates the quality of decoded data.

As one method for preventing possible adverse effects caused by such loss of synchronization due to code errors, there is known a method as discussed in a printed material by David Redmill under the heading of Ro bust Architectures for Image and Video Coding 2nd International Workshop on Mobile Multimedia communications (MoMuC), April 1995, or by David Redmill and N. G. Kingsbury under the heading of The EREC: An Error-Resilient Technique for Coding Variable-Length Blocks of Data IEEE Trans. Image Processing, vol. 5, pp. 565–574, April 1996, in which data blocks are reorganized to pseudo fixed length codes for each group of variable length coded data blocks so that the code of each data block in any selected group will become equal in length, and then each of such data blocks is transmitted.

In the method taught by those printed materials, data blocks are reorganized, on the coding side, to pseudo fixed length data blocks, and then, the data blocks are decoded and the end locations of each coded word and each data block are detected to reconstitute the data blocks into the original data blocks having variable lengths utilizing the nature or characteristic of the above-mentioned variable length codes.

Thus, even if an loss of synchronization should occur due to code errors, a synchronization would be recovered at the head of each data block by transmitting the data in the form of data blocks having fixed lengths.

There is also known another Japanese patent application No. 43118/1996 under the tile of Variable Length Coded Data Transmission Device which proposes, based on the method taught by the above-mentioned printed materials, a method for effectively preventing adverse effects from an loss of synchronization due to code errors. In order to avoid or obviate the problems inherent in the method taught by the above-mentioned printed materials in that if one data block among groups of variable length coded data blocks, having lengths of codes which are remarkably longer than other variable length coded data blocks, exists, code errors are even increased for that specific data block, the method proposed by the above-mentioned Japanese patent application makes it possible to reduce adverse effects to the data coded to have the variable lengths due to code errors by combining a method for dividing the data block which has the remarkably long code length with a method for selecting the groups of data blocks.

However, in case of either the method taught by the above-mentioned printed materials or the method taught by the above-mentioned Japanese patent application, in order to reconstitute, on the decoding side, the data blocks which are constituted to pseudo fixed length codes, into the original variable length coded data blocks, it is necessary to transmit the information on the code lengths of the data blocks having the fixed length and the number of the data blocks, together with the information on the data blocks.

Therefore, the quantity of information to be transmitted is increased to that extent. In addition, if code errors should be included in that information, it would become impossible to reconstitute the variable length coded data blocks or a reconstitution would be carried out in a wrong manner. As a result, the group of data blocks would be entirely lost.

Furthermore, in the method taught by the above-mentioned application, the division of the data blocks having the long code length and the selection of groups of data blocks are carried out. In that case, it is also necessary to transmit information on the division of data blocks and on the selection of groups, together with information on the data blocks. Therefore, even in case code errors occur to those information components, it also becomes impossible to reconstitute the data blocks, or a reconstitution is carried out in a wrong manner.

Moreover, in the method for reorganizing to pseudo fixed length codes, each code is decoded and the end locations of each coded word and each data block are detected to reconstitute the original data blocks having variable lengths from the data blocks having the fixed length, as mentioned above. At that time, if it happens that due to occurrence of code errors, a code word indicating the end of the data blocks is decoded to a different code word or other code words are decoded to a code word indicating the end of data blocks, incorrect variable length coded data blocks are obtained. However, since it is practically impossible to distinguish the correctly decoded data blocks from the incorrectly decoded data blocks, the incorrect data blocks are output in that condition.

SUMMARY OF THE INVENTION

In view of the above problems, the first object of the present invention is to provide a variable length coded data transmission device, a transmitter side device, a receiver side device, and a method thereof, in which the aforementioned method for reorganizing to pseudo fixed length codes without a need of additional information to which an accidental occurrence of code errors can give a vital adverse effect, and in which such adverse effects of code errors can be reduced.

The second object of the present invention is to avoid a problem caused by presence of data blocks, which each have a remarkably long code length than other variable length coded data blocks, among groups of variable length coded data blocks which are to be reorganized to pseudo fixed length codes, even in case no additional information is used.

The third object of the present invention is to avoid an accidental bringing-out of information pertaining to the method for reorganizing to pseudo fixed length codes, in case no additional information is used.

The fourth object of the present invention is to prevent an output of incorrect data blocks when the decoding side obtains variable length coded data blocks which are incorrectly reconstituted due to occurrence of code errors, in case the afore-mentioned method for organizing to pseudo fixed length codes is used.

To achieve the above objects, according to the present invention, there is provided a variable length coded data transmission device comprising first grouping means for grouping a plurality of variable length coded data, second grouping means for fixing the length of each of the variable length coded data thus grouped so that the data blocks each have an average code length and then grouping the data blocks in that condition, header preparing means for preparing a header including at least a synchronization word, outputting means for outputting the header prepared by the header preparing means and the group of data blocks grouped by the second grouping means, inputting means for inputting the header and the group of data blocks output by the outputting means, and synchronizing/decoding means for synchronizing/decoding each data block with reference to a location of the synchronization word in the header thus input.

BEST MODE FOR CARRYING OUT THE INVENTION

For facilitating easy understanding of the present invention, a couple of modes for carrying out the present invention will now be described. It should be noted, however, that such embodiments merely show one mode for carrying out the present invention, and the invention should not be limited to those embodiments. Instead, various changes can be made, if necessary, without departing from the scope of the present invention.

<1. First Mode for Carrying Out the Invention>

Figure 1:
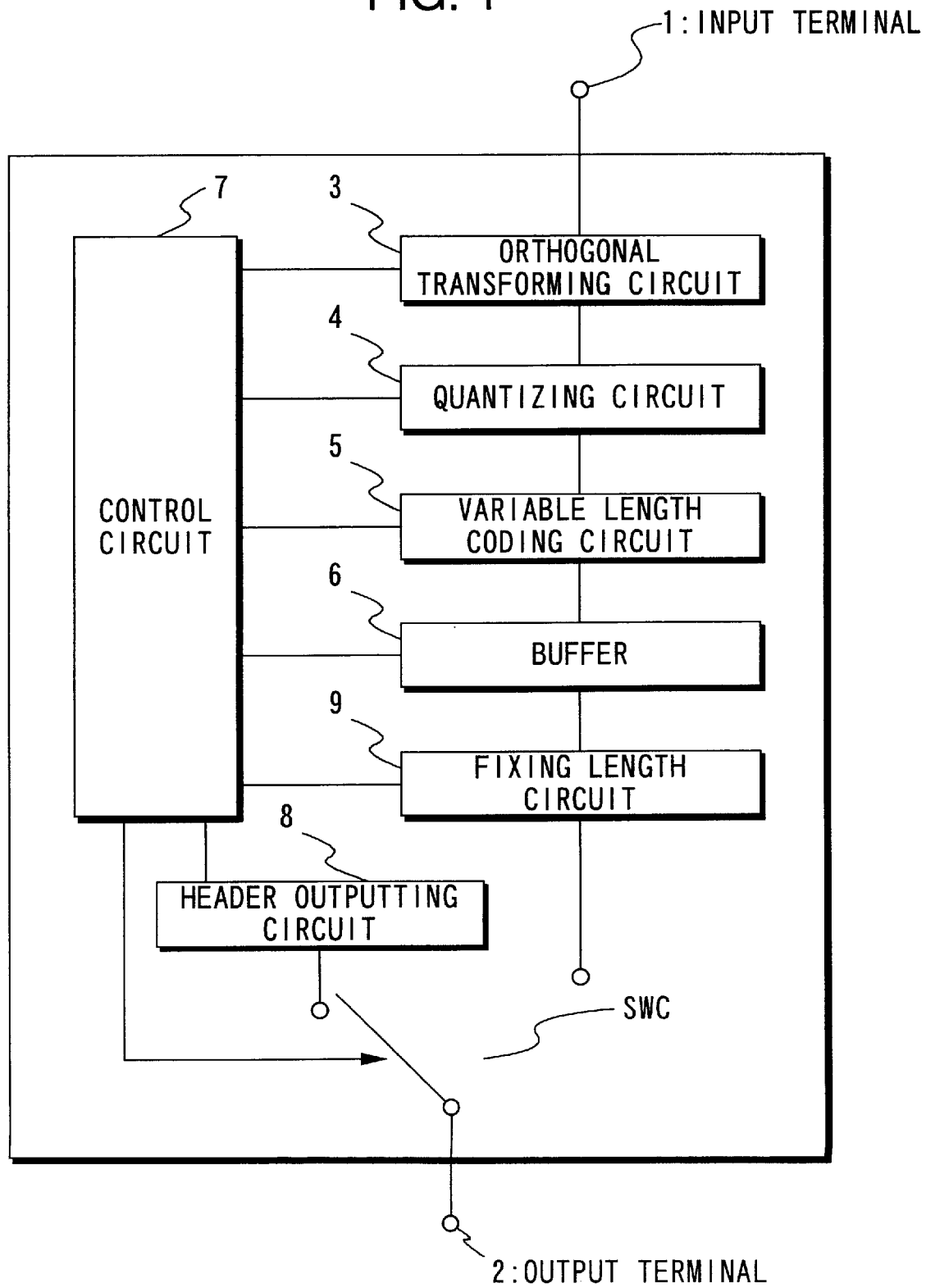
FIG. 1 is a block diagram showing a configuration of a coding device for use in a moving picture code transmission device according to the first embodiment of the present invention.

First, the first mode for carrying out the present invention will be described in which the present invention is applied to a moving picture code transmission device. FIG. 1 is a block diagram showing a configuration of a coding device according to this first mode or embodiment. The coding device compresses and codes moving picture data input from an input terminal 1, causes the variable length coded data to have a pseudo fixed length and then outputs the coded data to be transmitted from an output terminal 2.

In FIG. 1, moving picture data consisting of a series of frames are input in sequential order through the input terminal 1. An orthogonal transforming circuit 3 makes a two-dimensional orthogonal transformation with respect to the input moving picture data for each frame and outputs transform coefficients which are obtained as a result of the transformation. A quantizing circuit 4 quantizes those transform coefficients and outputs them in that condition. A variable length coding circuit 5 codes those transform coefficients thus quantized so as to have variable lengths and outputs the variable length coded data.

Here, handling of data from the inputting of moving picture data to the variable length coding of the data, is carried in the block unit which block is obtained by dividing a single frame into a predetermined number of pixels. For this reason, the variable length coded data output from a variable length coding circuit 5 are data blocks on the basis of the block unit.

A buffer 6 temporarily stores blocks of variable length coded data in sequential order (in a series of addresses). Here, a control circuit 7 controls each component part of the device. In particular, the control circuit 7 determines the data blocks, which constitute a group of data blocks, among several succesive variable length coded data blocks stored in the buffer 6 and notifies a header outputting circuit 8 of the information on the group. The term "information on the group" herein used refers to information on the address where the variable length coded data block located on the head of the group is stored.

The header outputting circuit 8 outputs a header which includes, firstly, synchronization words irrelevant of the variable length coded data blocks and, secondly, the address information notified. Although the synchronization words may be located at any place, they are supposed to be located on the head of the header here for the sake of convenience of explanation.

On the other hand, a fixing length circuit 9 reads the variable length coded data blocks stored in the buffer 6 for each group which is determined by the control circuit 7 and reorganizes the variable length coded data blocks to pseudo fixed length data blocks in accordance with the method discussed in the previously-mentioned printed materials, so that such pseudo fixed data blocks constitute a group of data blocks. At that time, an acceptable method may be, for example, such that data blocks are added to the group of data blocks in sequential order and the code length of the whole group is checked each time the data blocks are added, so that when the code length exceeds a predetermined value, the data blocks so far added are determined as a single group of data blocks and those data blocks, which are to be added after the code length exceeds a predetermined value, are determined to constitute another group of data blocks. The code length of each pseudo fixed data block is an average code length of the specific group of data blocks.

Figure 2:
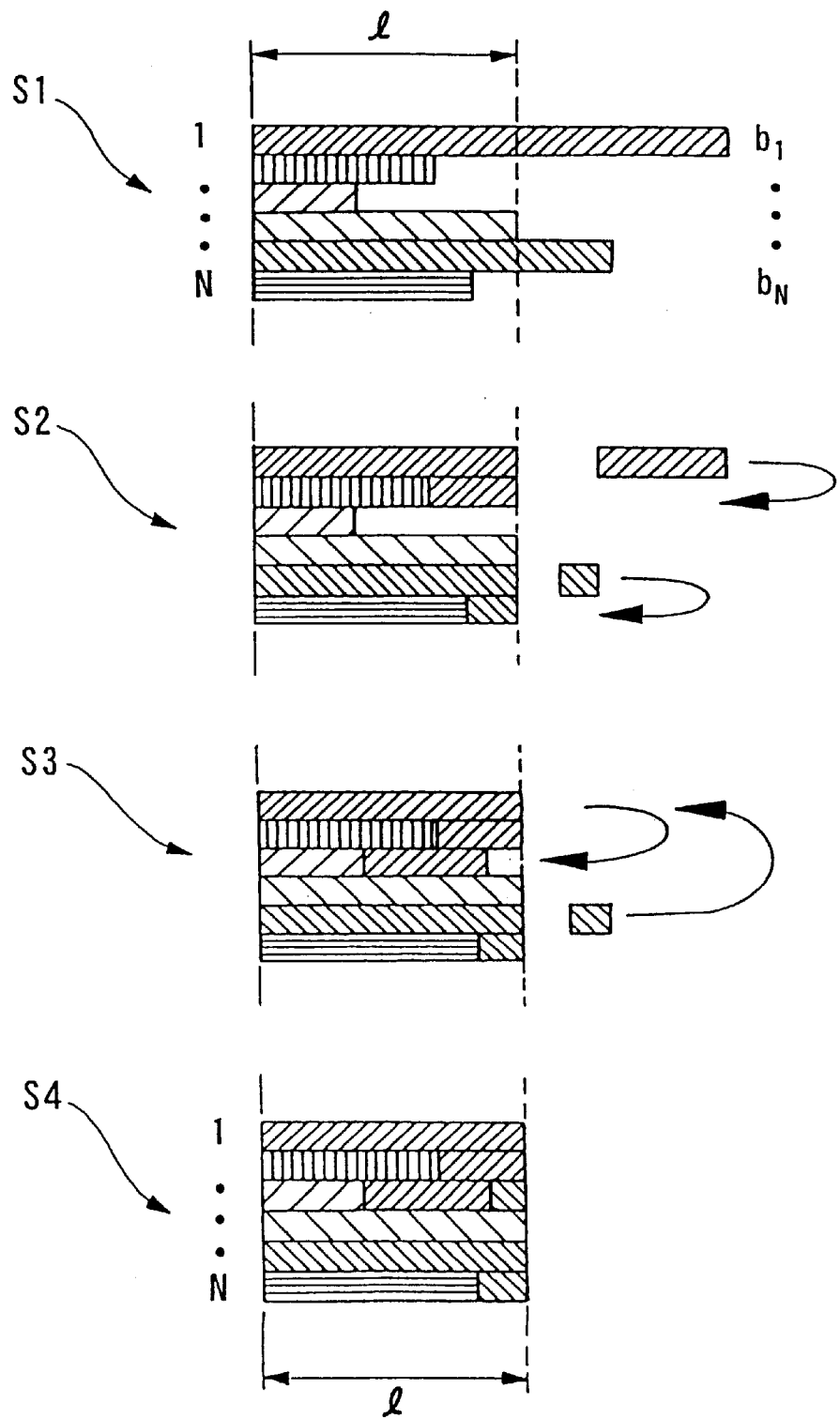
FIG. 2 is a conceptual view showing a model of reorganizing operation to pseudo fixed length codes.

The model of reorganizing variable length codes to pseudo fixed length codes will now be described with reference to FIG. 2.

Now, presume that there are a number, N, of variable length coded data blocks and that a bit length of each variable length coded data block i is represented by $b_i$ ($0 \leq i \leq N-1$). It should be also noted that the numerical value including i is hereinafter supposed as a mod N.

First, prior to transmission of the number, N, of variable length coded data blocks, an average $s \geq (1/N)$ sum $b_i$ (where the sum is an operator indicating a sum of i=0 to N−1) is obtained.

Then, a number, N, of slots each having a bit length s is imagined. Various stages of operation to be described hereinafter are made with respect to those slots. On the first stage S1, as shown in FIG. 2, each bit constituting the variable length coded data block i ($0 \leq i \leq N-1$) is filled in each bit location constituting each slot ($0 \leq i \leq N-1$). At that time, with respect to the block i which satisfies $b_i<s$, the slot i has excessive bits (namely, the slot i has extra space to receive additional bits). On the other hand, with respect to block i which satisfies $b_i>s$, all of the bits cannot be filled into the slot i. If some blocks have too many bits to fill therein, the process proceeds to the second stage. On the second stage S2, with respect to those bits, which could not be filled in the block i, a judgment is made as to whether or not they can be filled in the following slot (namely, adjacent slot) as shown in FIG. 2. If the bit length of the block i+1 to be assigned to the following slot i+1 satisfies $b_{i+1}<s$, the slot i+1 has an empty area behind the bits of the block i+1 and therefore, the excessive bits, which could not be filled in the slot i and overflowed, are filled in this empty area. In case there still remains a block having bits, which could not be filled in the empty area, the process proceeds to the third stage S3 where the remaining excessive bits are filled in the following slot i+2 of the slot i+1 as shown in FIG. 2. If such a filling operation is repeated by N-times at the most, the bits of the number, N, of the blocks can all be filled in the slots. The resultantly obtained data can be handled as the number, N, of pseudo fixed length codes (hereinafter referred to as the fixed length data block) having a bit length s as indicated by S4.

In this way, variable length coded data blocks are reorganized to pseudo fixed length codes, then each data block having such a pseudo fixed length is transmitted and decoded on the receiver side. To decode the variable length coded data blocks transmitted sequentially, on receiver side one after another, it is necessary that the start point of each variable length coded data block is detected when the decoding of the previous variable length coded data is finished.

However, as apparent from the hereinbefore description, the variable length coded data blocks are reorganized to pseudo fixed length data blocks and transmitted so that the start point of each variable length coded data block is always located on the start point each pseudo fixed data block.

Accordingly, on the receiver side, decoding of each variable length coded data block may be always started at the starting timing of each fixed length data block.

In this way, decoding of each variable length coded data block is started. However, the decoding of a variable length coded data block which spreads over a plurality of fixed length data blocks can not be accomplished even if the decoding of the bits from one fixed length data block is finished. Accordingly, it is necessary for such a variable length data block spread over a plurality of fixed length data blocks that all data bits of the variable length data block have to be obtained from a plurality of fixed length data blocks over which the variable length data block spreads.

That is, for decoding, the procedures at each stage are performed in the following manner. First, suppose the number, N, of slots having a bit length s are present and presume that the received fixed length coded data blocks are filled respectively in these slots. On the first stage, decoding is performed from the top bit location of each slot. At that time, if there is present a slot, whose decoding is not yet finished, in a location somewhere before the s-th bit, the process proceeds to the second stage. On the second stage, the slot i whose decoding is not yet finished is checked as to whether or not decoding is finished in the following slot i+1 and a judgment is made as to whether or not a block i+1 satisfying $b_{i+1}<s$ is obtained. If the judgment result is affirmative, the bits of the remaining area in the slot i+1 are added to the slot i and decoding is further performed with respect to the slot i. If the decoding is not yet finished in spite of the addition of the bits in the slot i+1, the process proceeds to the third stage where the bits in the following slot i+2 of the slot i+1 are added. If this bit-adding operation is repeatedly performed by the same number of repetition of filling operations at the transmitter side, the original number, N, of variable length code blocks can be obtained.

As discussed hereinbefore, the variable length coded data blocks are formed as pseudo fixed length codes having s * N bits, and transmitted. With respect to each block to be transmitted as the starting timing of the slot, even if transmission errors should occur to the preceding block, no loss of synchronization, which would otherwise occur due to transmission errors, would occur and decoding would be performed at the normal timing. That is, even if errors occur in the midway, a correct synchronization can be obtained for each block at the time for decoding. Thus, an occurrence of decoding errors on a large scale can be prevented.

When the variable length coded data are reorganized to pseudo fixed length code data in the manner as described above, the control circuit 7 controls a switch SWC such that after a header is output from the header outputting circuit 8, a group of data blocks pertaining to this header is output.

Figure 3:
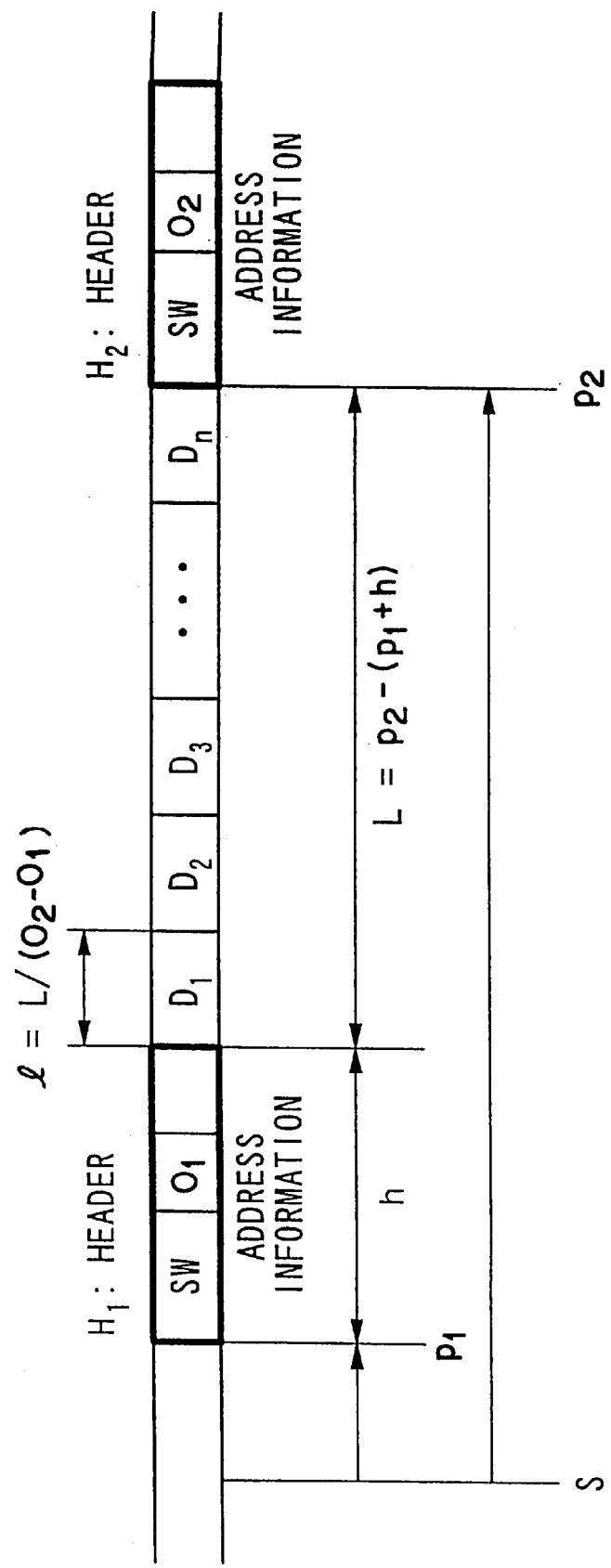
FIG. 3 is a representation for explaining the condition of coded data which are output from a coding device.

Therefore, the coded data (group of data blocks) output from the coding device thus constructed is as shown in FIG. 3. That is, the group of data blocks is constituted by a plurality of pseudo fixed data blocks $D_1$ through $D_n$. On the head of that group, there exists a header including a synchronization word SW and the address information of the head block of the specific group of data blocks.

Figure 4:
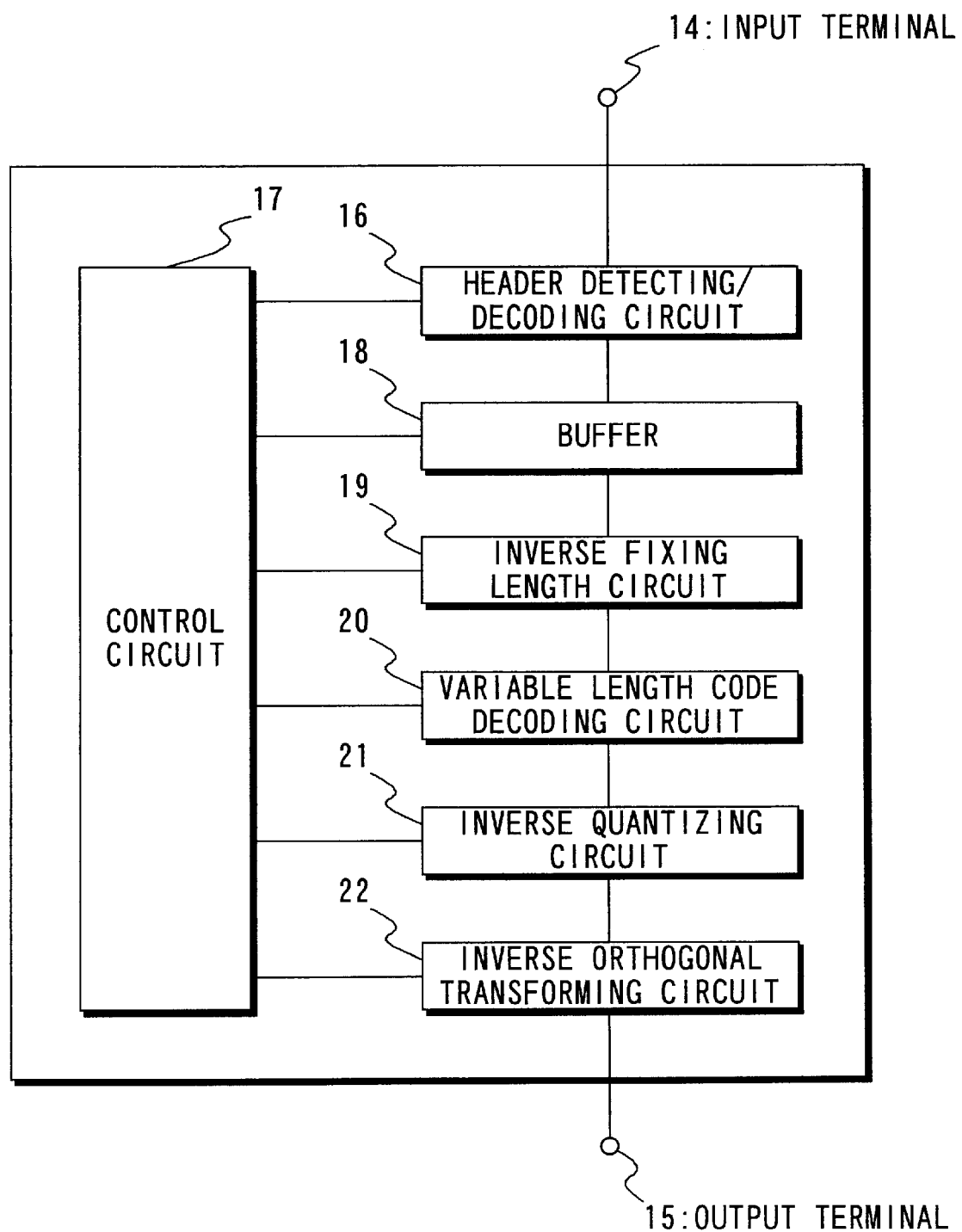
FIG. 4 is a block diagram showing a configuration of a decoding device for use in the first embodiment.

Next, a decoding device according to this mode for carrying out the present invention will be described. FIG. 4 is a block diagram showing a construction of the decoding device according to this mode for carrying out the present invention. This decoding device decodes the coded data input from an input terminal 14 and outputs the decoded moving picture data from an output terminal 15.

In FIG. 4, the data coded by the coding device of FIG. 1 are input through the input terminal 14.

A header detecting/decoding circuit 16, firstly, detects a synchronization word among the input coded data, secondly, obtains the code lengths of the data blocks and the number of data blocks which constitute a group in the below-stated manner and notifies a control circuit 17 of them, and thirdly, removes the header and outputs only the group of data blocks.

Here, description will be made as to how to obtain the code lengths of data blocks and the number of data blocks which constitute a group is described.

Now, presume that coded data are input as shown in FIG. 3, that the code length of the header is represented by h, that the first synchronization word SW is detected at a location away by a code length a from a reference position S, and that the following synchronization word SW is detected at a location away by a code length b from the reference position S. Then, the code length L of the group of data blocks between those synchronization words is expressed by the following equation.

$$L=b-(a+h) \tag{1}$$

Next, if the address of the head data block D1 is indicated as c based on the address information included in the first header H1 and if the address of the head data block Dn+1 is detected as d based on the address information included in the following header H2, the number n of the data blocks between the two synchronization words SW is expressed by the following equation.

$$n = d - c \quad (2)$$

Here, since the code length of the data blocks, which constitute a group, is fixed by the fixing length circuit 9, they are equal to each other in this mode for carrying out the present invention. Therefore, the code length s of each data block is expressed by the following equation.

$$s = L/n \quad (3)$$

Reference is made back to FIG. 4. A buffer 18 temporarily stores groups of data blocks. An inverse fixing length circuit 19 reconstitutes the groups of data blocks stored in the buffer 18 to the original variable length coded data blocks in accordance with the method discussed in the previously-mentioned printed materials, while utilizing the information on the length s the data blocks and the number, n, of the data blocks from the control circuit 17 and outputs them in sequential order.

A variable length code decoding circuit 20 decodes the reconstituted variable length coded data blocks. The decoded data are inverse quantized by an inverse quantizing circuit 21, so as to be transformed to the original transform coefficient. This transform coefficient is decoded to the original moving picture data by an inverse orthogonal transforming circuit 22, so as to be output through the output terminal 15.

According to the conventional method, the information on the code length of the data blocks used for reorganizing to pseudo fixed length codes is also output from the fixing length circuit. For this reason, if even a minor code error should occur to those information components, it would become impossible for the receiver side to obtain the original variable length coded data blocks by reconstituting the pseudo fixed length data blocks. This may lead to reduced picture quality.

In this mode for carrying out the present invention, the information on the code lengths of the data blocks and the number of the data blocks used for reorganizing to pseudo fixed length codes is obtained not through transmission but by detecting the synchronization words and through calculation based on the result obtained by decoding the header. Therefore, even if code errors should occur, a reconstitution of the data blocks would still be possible by detecting the synchronization words and obtaining the header. Thus, it can be avoided such a risk that the data blocks are totally lost due to code errors partly occurred to the information.

Operation for coding a moving picture, excluding operation for reorganizing to pseudo fixed length codes, may be similar to that recommended, for example, in ITU-T Recommendation H. 263 "Video Coding for Low Bitrate Communication", March 1996. In H.263, there exists a construction called GOB (Group Of Block) header including the synchronization words, or a construction called MB (Macro Block) as a data unit having a variable code length. In case the operation for coding the moving picture similar to H. 263, the GOB header, for example, is output from the header outputting circuit 8, and a single MB can be utilized as a single variable length coded data block. By doing so, there can be obtained a code outputting and a coding/decoding circuit, similar to H. 263, excluding reorganizing MB to pseudo fixed length codes within the GOB. Thus, this method can be in common with the general moving picture coding method.

Although the present invention is applied to the transmission of moving picture data in this mode for carrying out the present invention, the present invention is not limited to the moving picture data but it can be applied to variable length coded data in general.

In this mode for carrying out the present invention, the number of data blocks and the code length of each data block are found with reference to the location and the address of the synchronization word. The same effects can also be obtained, without a need of using address information, by preliminarily setting the number of data blocks to be grouped, and using, on the decoding side, this number together with the location of the synchronization word.

<2. Second Mode for Carrying Out the Invention>

In the above-mentioned moving picture code transmission device according to the first mode for carrying out the present invention, it is impossible for the decoding side to discriminate the incorrectly reconstituted variable length data blocks merely by constituting the original variable length coded data blocks simply by judging whether or not each code can be decoded.

However, if the coding side adds a check word to each variable length data block before constituting data blocks each having a fixed length, the decoding side can know whether or not the data blocks are correctly reconstituted, by checking the check word after the completion of reconstitution of the variable length coded data blocks.

The second mode for carrying out the present invention will now be described, in which this point is taken into consideration.

Figure 5:
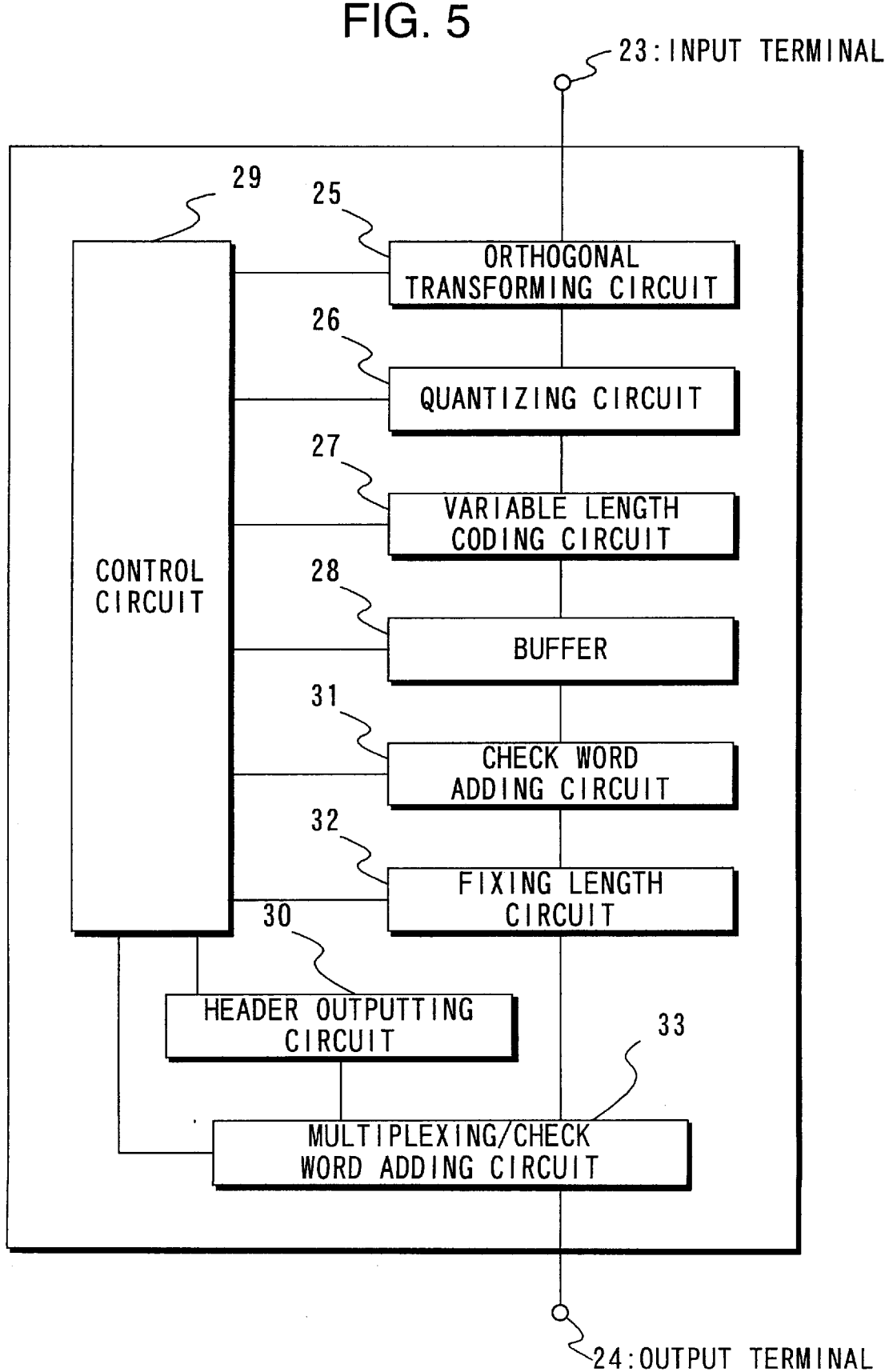
FIG. 5 is a block diagram showing a configuration of a coding device for use in a moving picture code transmission device according to the second embodiment of the present invention.

This second mode for carrying out the invention is described. In the second mode, the invention is also applied to a moving picture code transmission device. FIG. 5 is a block diagram showing a configuration of its coding device.

As shown in FIG. 5, this second mode is the same as the first mode in construction from an input terminal 23 to a buffer 28. Therefore, the different points are mostly described.

A control circuit 29 retains the code lengths of the variable length coded data blocks stored in the buffer 28, and determines those data blocks which constitute a group based on this information. Especially, the control circuit 29 controls such that the code lengths of the individual data blocks included in a group are not greatly different.

For example, the control circuit 29 makes the following control. First, the groups of data blocks are constituted one after another by adding data blocks one by one thereto, and an average code length of the respectively data blocks included in that group is calculated. Then, the code length of a new data block is checked when it is added to each group of data blocks. When the checking result reveals that the code length exceeds plus minus 70% of the average code length of the group of data blocks, a new group is constituted with the data block to be added, located on the head. In contrast, when the code length does not exceed the plus minus 70% of the average code length, that data block is added directly to the group. It should be noted that the threshold value is not limited to plus minus 70% but it can be set optionally.

When the data blocks are thus grouped, the control circuit 29 notifies a header outputting circuit 30 of the information on the group of data blocks. The header outputting circuit 30 outputs the header which includes the synchronization word and the address information of the data block located on the head of the group.

A check word adding circuit 31 reads the variable length data blocks stored in the buffer 28, for each group determined by the control circuit 29, and outputs the block data to a fixing length circuit 32 after adding a data block check word having a predetermined constitution, for example, two bits of "01", for each data block. The fixing length circuit 32 reorganizes variable length data blocks which are added check words to pseudo fixed length data blocks, in accordance with the method taught by the previously-mentioned printed materials, and constitute groups of pseudo fixed data blocks.

A multiplexing/check word adding circuit 33 sequentially links the header output by the header outputting circuit 30 to the group of data blocks constituted by the fixing length circuit 32 so that a single output unit is formed. At that time, the multiplexing/check word adding circuit 33 checks the sum of the code lengths and then calculates what bits are to be added to make the sum of the code lengths into a multiple of a predetermined numerical value in case the sum of the code lengths is not a multiple of a predetermined constant (for example, multiple of one byte).

Subsequently, the multiplexing/check word adding circuit 33 adds as many bits each having a predetermined constitution (for example, a word starting with "0" of one bit and having a plurality of "1" coming in sequence thereafter) as required by calculation to a tail end of the output unit (consisting of a header and a group of data blocks) to form a group of data blocks check word, so that the code length of a single output unit will be a multiple of a predetermined constant. The output of the multiplexing/check word adding circuit 33 is output in sequential order through the output terminal 24 and then transmitted.

Figure 6:
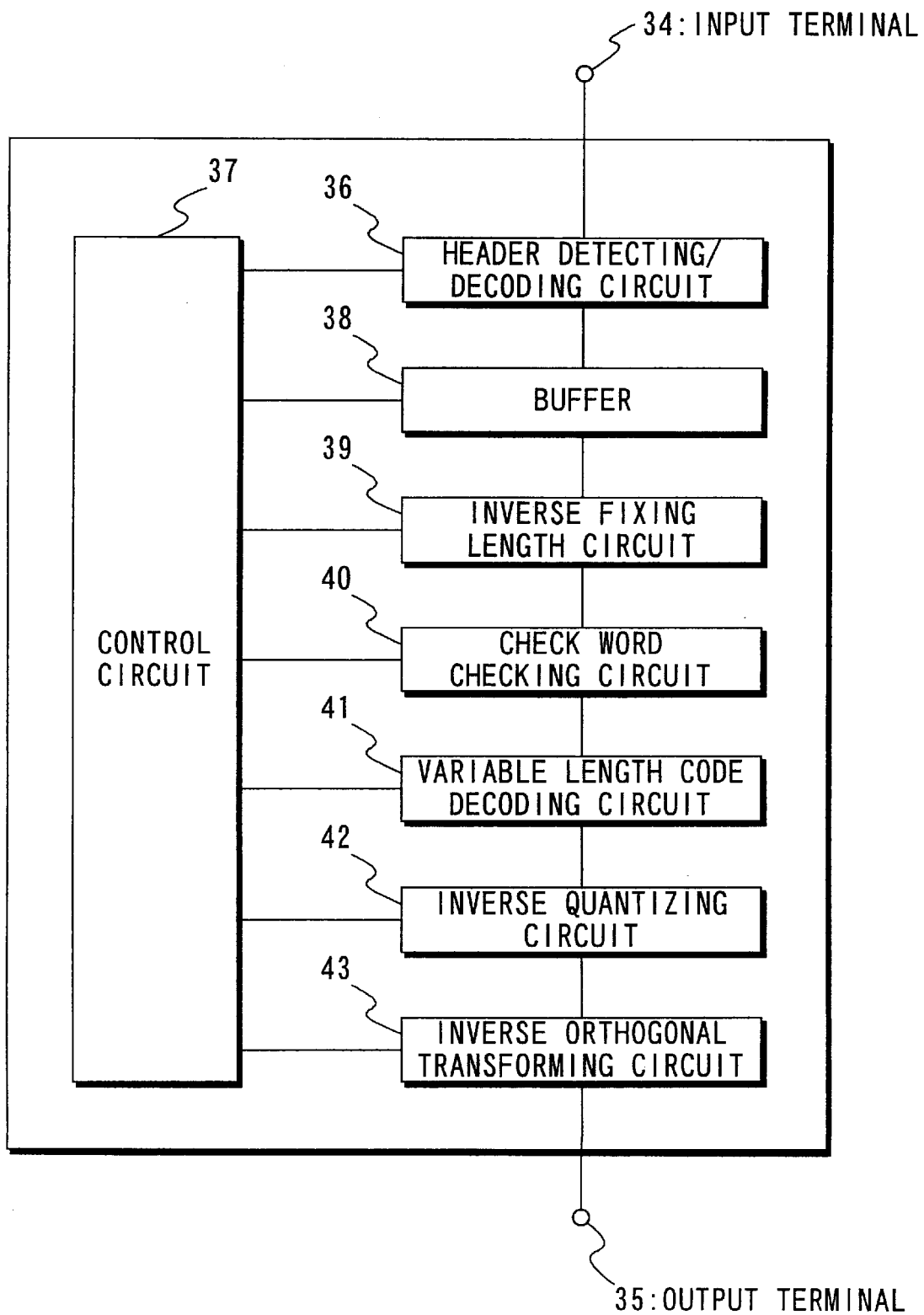
FIG. 6 is a block diagram showing a configuration of a decoding device for use in the second embodiment.

A decoding device according to this mode for carrying out the present invention will now be described. FIG. 6 is a block diagram showing a configuration of a decoding device according to this mode.

As shown in FIG. 6, this decoding device decodes the coded data input through an input circuit 34 and outputs the original moving picture data through an output terminal 35.

In FIG. 6, the incoming data coded by the coding device of FIG. 5 are input through the input terminal circuit 34. A header detecting/decoding circuit 36 detects each synchronization word among the coded data thus input, decodes the header including the address information of the head data block coming after the synchronization word, and then removes the header. In the header detecting/decoding circuit 36, the code length L between two synchronization words is obtained from the equation (1), and the number n of the data blocks between two synchronization words is obtained from the equation (2).

Here, owing to the processing made by the multiplexing/check word adding circuit 33, the synchronization word appears only in position on a bit sequence which is a multiple of a predetermined constant. Therefore, if the code length of each fixed length data block between two synchronization words is represented by s, the following equation is not necessarily derived.

$$L = n*s \quad (4)$$

In this case, the header detecting/decoding circuit 36 detects the data blocks group check word first.

For example, if the data blocks group check word is a word starting with "0" of one bit and having a plurality of "1" coming in sequence thereafter, a code length w of the word having such a constitution, located immediately before the synchronization word is checked. When the code length w of the data blocks group check word is obtained in this way, the code length s of each fixed length data block between two synchronization words can be obtained from the following equation.

$$s = (L - w)/n \quad (5)$$

Then, the header detecting/decoding circuit 36 notifies a control circuit 37 of the data blocks number n and the code length s thus contained.

At that time, the header detecting/decoding circuit 36 checks whether or not the code length obtained by checking the data blocks group check word is correct. If the header is correctly decoded, the value obtained by the equation of (5) is divisible. Therefore, if it is indivisible, it can be considered that some code errors have occurred. In that case, the header detecting/decoding circuit 36 discards the current data between two synchronization words without doing the processes thereafter.

On the other hand, if the equation (5) is divisible, it is known that they are a correctly transmitted group of data blocks each having a pseudo fixed length. Therefore, the header detecting/decoding circuit 36 outputs this data blocks group so as to be stored in a buffer 38.

An inverse fixing length circuit 39 reconstitutes the group of data blocks stored in the buffer 38 into the original variable length coded data blocks utilizing the information on the code length s and the data blocks number n with respect to the data blocks from the control circuit 37 and outputs the group of data blocks thus reconstituted in sequential order. This technique is taught by the previously-mentioned printed materials.

A check word checking circuit 40 checks whether or not the data blocks check word added to each data block of the reconstituted variable length coded data by the check word adding circuit 31 is a predetermined one. If the checking result is negative, the check word checking circuit 40 discards the specific data blocks considering that they are not correctly reconstituted.

In contrast, if the checking result is affirmative, the check word checking circuit 40 outputs those data blocks in sequential order considering that they are correctly reconstituted.

The data blocks thus output are decoded into the original moving picture data during the course via a variable length code decoding circuit 41, an inverse quantizing circuit 42 and an inverse orthogonal transforming circuit 43, and then output from the output terminal 35.

In this mode for carrying out the present invention, it can be avoided such a risk that the data blocks are totally lost due to code errors occurred to part of the information as in the first mode.

Further, in this mode for carrying out the present invention, the data blocks group is constituted such that the code length of each data block included in a certain data blocks group will not be greatly different. Owing to this feature, there can be obviated such inconvenience that if a data block having a remarkably longer code length than other variable length coded data blocks exists in the group of variable length coded data blocks, the adverse effects caused by code errors are even increased with respect to that particular data block.

Furthermore, in this mode for carrying out the present invention, it is designed such that the synchronization word appears only in a predetermined position on the bit sequence and a check word is added to the group of data blocks. By utilizing this, the probability for incorrectly detecting the synchronization word is reduced in the decoding device. Thereafter, the check word is checked to find out whether or not an incorrect data block length and an incorrect number of data blocks are obtained. By doing so, it can be prevented that a reconstitution of a pseudo fixed length data blocks is carried out in a wrong manner caused by incorrect detection of the synchronization words, etc.

In addition, in the coding device of this mode, a check word is added to the variable length coded data blocks before being reorganized to pseudo fixed length data blocks.

By utilizing this, in the decoding device, the reconstituted variable length coded data blocks are checked to make sure that the reconstitution is carried out in a correct manner. By doing so, it can be prevented to accidentally output incorrect variable length coded data blocks.

In this second mode, a method in combination with the limitation of the position of the synchronization word is shown as a method for adding a data blocks group check word. It should be noted, however, that other methods may, of course be employed. It is of course possible to employ the method which always adds the fixed length check word. The data blocks group check word itself may of course be different from that of the second mode.

In the second mode for carrying out the present invention, the whole variable length coded data blocks is checked by the data block check word. However, it is also possible to design such that the data blocks are partly checked and the reconstituted data blocks are output only if it can be make sure that only that part of the data blocks is reconstituted in a correct manner. The data block check word itself may of course be different from that of the second mode.

Further, the general method for coding a moving picture as in the first mode is likewise applicable to the operation for coding a moving picture excepting the operation for reorganizing to pseudo fixed length codes employed in this second mode.

Furthermore, in the second mode, the present invention is applied to moving picture data. It should be noted, however, that the present invention is not limited to the moving picture data but it can be applied to the variable length coded data in general as in the first mode.

Further, in the first and second modes, a method for controlling the grouping of data blocks is shown. It should be noted, however, that the present invention may of course employ other control methods.

In the second mode, the number of data blocks and the code length of each data block are found with reference to the location and the address of the synchronization word as in the first mode. The same effects can also be obtained, without a need of using address information, by preliminarily setting the number of data blocks to be grouped, and using, on the decoding side, this number together with the location of the synchronization word.

What is claimed is:

1. A method for transmitting variable-length blocks of data from a sending side to a receiving side, comprising the steps of:
   (a) arranging said variable-length blocks into groups at said sending side;
   (b) placing, at said sending side, variable-length blocks of data in each group into slots of a fixed length to thereby form a train of groups of fixed length slots of data;
   (c) attaching, at said sending side, a header to each slot group, each header having an equal header length and including an ordinal slot number, counted from the first slot in said train, of the first slot in the slot group to which it is attached;
   (d) determining, at said receiving side, a length of fixed length slots in each group based on a position of each header in said train and said header length, using a first equation, $$L_i = p_{i+1} - p_i - h,$$

where $L_i$ denotes a length of an i-th group in said train, $p_i$ denotes a position of the header attached to the i-th group, and h denotes the length of said header;

(e) determining, at said receiving side, a number of slots in each group, using a second equation, $$n_i = o_{i+1} - o_i,$$

where $n_i$ denotes a number of slots in the i-th group in said train, and $o_i$ denotes an ordinal slot number included in the header attached to the i-th group in said train;
   (f) determining, at said receiving side, a fixed length of slots in each group, using a third equation, $$l_i = L_i / n_i,$$

where $l_i$ denotes a fixed length of the slots in the i-th group in said train; and
   (g) reconstructing, at said receiving side, said variable-length blocks of data from said fixed length slots of data based on the number ($n_i$) of slots in each group and the fixed length ($l_i$) of slots in each group.

2. A method for transmitting variable-length blocks of data according to claim 1, further including the steps of:
   adding, at said sending side, a data block check word to each of said variable-length blocks of data before they are placed into fixed length slots; and
   examining, at said receiving side, if each of the reconstructed blocks has the same data block check word as added at said sending side in order to determine if the blocks of data have been correctly reconstructed.

3. A method for transmitting variable-length blocks of data according to claim 1, further including the step of adding to each slot group, at said sending side, a complementary code of a length which is variable so that a total length of the header and each slot group will become a number multiple of a predetermined value, wherein in place of said first equation, said step (d) uses a fourth equation, $$L_i = p_{i+1} - p_i - w_i - h,$$

where $w_i$ denotes a length of a complementary code attached to the i-th group in said train.

4. A receiving device for receiving a train of groups of fixed length slots of data and reconstructing variable-length blocks of data from the received fixed length slots of data, each group being attached with a header having a fixed header length and including an ordinal slot number, counted from the first slot in said train, of the first slot in the group to which it is attached, comprising:
   (a) a header detecting/decoding circuit for
      determining a length of each slot group based on a position of each header in said train and said header length, using a first equation, $$L_i = p_{i+1} - p_i - h,$$

where $L_i$ denotes a length of an i-th group in said train, $p_i$ denotes a position of the header attached to the i-th group, and h denotes the length of said header,
      determining a number of slots in each group, using a second equation, $$n_i = o_{i+1} - o_i,$$

where $n_i$ denotes a number of slots in the i-th group in said train, and $o_i$ denotes an ordinal slot number included in the header attached to the i-th group in said train, determining a fixed length of slots in each group, using a third equation, $$l_i = L_i/n_i,$$

where $l_i$ denotes a fixed length of the slots in the i-th group in said train; and (b) a inverse fixing length circuit for reconstructing said variable-length blocks of data from said fixed length slots of data based on the number ($n_i$) of slots in each group and the fixed length ($l_i$) of slots in each group.

5. A method for transmitting variable-length blocks of data from a sending side to a receiving side, comprising the steps of:

(a) dividing said variable-length blocks into groups at said sending side, each group having a predetermined number of blocks;

(b) placing, at said sending side, variable-length blocks of data in each group into slots of a fixed length to thereby form a train of groups of fixed length slots of data, each slot group having said predetermined number of slots;

(c) determining, at said receiving side, a length of each slot group by detecting the start or end of each slot group in said train;

(d) determining, at said receiving side, a fixed length of slots in each group, using a equation, $$l_i = L_i/n,$$

Where $l_i$ denotes a fixed length of slots in an i-th group in said train, $L_i$ denotes a length of the i-th group in said train, and n denotes said predetermined number of slots in each group; and (e) reconstructing, at said receiving side, said variable-length blocks of data from said fixed length slots of data based on the predetermined number (n) of slots in each group and the fixed length ($l_i$) of slots in each group.

6. A receiving device for receiving a train of groups of fixed length slots of data, each slot group including a predetermined number of slots, and reconstructing variable-length blocks of data from the received fixed length slots of data, comprising:

(a) a header detecting/decoding circuit for
determining a length of each slot group by detecting the start or end of each slot group in said train,
determining a fixed length of slots in each group, using a equation, $$l_i = L_i/n,$$

where $l_i$ denotes a fixed length of slots in an i-th group in said train, $L_i$ denotes a length of the i-th group in said train, and n denotes said predetermined number of slots in each group; and (b) a inverse fixing length circuit for reconstructing said variable-length blocks of data from said fixed length slots of data based on said predetermined number (n) of slots in each group and the fixed length ($l_i$) of slots in each group.

* * * * *